(12) United States Patent
Ducker et al.

(10) Patent No.: US 8,202,609 B2
(45) Date of Patent: Jun. 19, 2012

(54) ABSORBENT MATERIAL WITH WET STRENGTH CONTAINING WAX

(75) Inventors: Paul M. Ducker, Brunswick, GA (US); Steven S. Harlen, Jesup, GA (US); David S. Varney, Odium, GA (US)

(73) Assignee: EAM Corporation, Jesup, GA (US)

( * ) Notice: Subject to any disclaimer, the term of this patent is extended or adjusted under 35 U.S.C. 154(b) by 746 days.

(21) Appl. No.: 12/378,405

(22) Filed: Feb. 13, 2009

(65) Prior Publication Data

US 2010/0209668 A1 Aug. 19, 2010

(51) Int. Cl.
*B32B 7/02* (2006.01)
(52) U.S. Cl. ......... 428/212; 428/156; 428/220; 264/175
(58) Field of Classification Search .................. 428/156, 428/212, 220; 264/175
See application file for complete search history.

(56) References Cited

U.S. PATENT DOCUMENTS

| | | | |
|---|---|---|---|
| 3,654,064 A | 4/1972 | Laumann | |
| 4,129,132 A | 12/1978 | Butterworth et al. | |
| 4,425,126 A | 1/1984 | Butterworth et al. | |
| 4,600,462 A | 7/1986 | Watt | |
| 4,601,938 A | 7/1986 | Deacon et al. | |
| 4,987,632 A | 1/1991 | Rowe et al. | |
| 5,231,122 A | 7/1993 | Palumbo et al. | |
| 5,399,366 A | 3/1995 | Geddes et al. | |
| 5,593,400 A * | 1/1997 | O'Leary | 604/385.27 |
| 5,599,550 A * | 2/1997 | Kohlruss et al. | 424/404 |
| 5,866,242 A | 2/1999 | Tan et al. | |
| 7,008,887 B2 * | 3/2006 | Rearick et al. | 442/79 |
| 7,122,023 B1 * | 10/2006 | Hinoki | 604/385.101 |
| 7,228,586 B2 | 6/2007 | Prodoehl et al. | |
| 7,300,547 B2 | 11/2007 | Luu et al. | |

* cited by examiner

*Primary Examiner* — David R Sample
*Assistant Examiner* — Lawrence Ferguson
(74) *Attorney, Agent, or Firm* — Wood, Phillips, Katz, Clark & Mortimer

(57) ABSTRACT

An absorbent material for use in a disposable absorbent product exhibiting enhanced wet strength characteristics includes a blend of cellulosic fibrous material and superabsorbent polymeric material, with a wax applied to the blend in a preferably discontinuous or non-uniform distribution for enhancing wet strength characteristics of the material, without unacceptably diminishing its absorbency. Notably, the absorbent material includes regions of relatively high densification, which can exist about particles of superabsorbent material, with application of wax in a molten form resulting in the spontaneous flow and migration of the wax to the regions of higher densification. The material can be formed with a pattern of regions of relatively high and low densification, with the wax preferentially distributed in those regions of high densification. It is believed that the wax acts to maintain the strength of hydrogen bonds formed within the absorbent material, by minimizing the effect of wetting the bonds when liquid is absorbed by the structure.

21 Claims, 3 Drawing Sheets

ABSORBENT MATERIAL WITH WET STRENGTH CONTAINING WAX

TECHNICAL FIELD

This invention relates to absorbent materials to be used as absorbent members in articles such as food pads, bed pads, hygiene products, wipers, mops and incontinent devices. More particularly, this invention relates to highly absorbent materials suitable for applications where wet strength and wet integrity are desirable attributes, with the present absorbent material comprising a blend of cellulosic fibrous material, and superabsorbent polymeric material, with a wax applied thereto to enhance the structural properties of the material by working in conjunction with hydrogen bonds formed with the material, while the desired level of absorbency for the material is maintained.

BACKGROUND

Disposable absorbent articles have found widespread use and acceptance. They are frequently constructed using absorbent structures containing comminuted wood pulp and in many cases superabsorbent polymer to provide the necessary absorbent function. In many applications, such as disposable sanitary napkins, diapers, and adult incontinent devices, this absorbent structure constitutes a core which is contained in a generally non-absorbent envelope consisting of some type of liquid permeable coverstock on one side, and an impervious film on the other side. In other applications, such as some type of absorbent food pads, the covering on both sides of the core is liquid permeable, such as using perforated films. In other applications such as mops and wipers, the envelope, if present in the design, functions to modify the surface for functions such as scrubbing or strength. Alternatively, these features and functions are performed by the core itself.

Absorbent members can be made concurrently with the rest of the article or can be pre-made as a roll good and supplied to the converting machine as a raw material. In this case, airlaid composite materials comprising cellulose fibers are frequently used to make absorbent members. In many applications, there is a need for the absorbent member to exhibit wet integrity, so that it does not break apart when the normal mechanical stresses of use are applied to the article after wetting. In these end uses, the airlaid composite material then needs to exhibit wet strength.

There are several functional aspects to wet strength. In most cases, the absorbent core is in the form of a flat sheet, and there is a need for wet tensile strength, in which the sheet resists tearing when tensile forces are applied in-plane to the wetted core. In another important aspect of wet strength, the absorbent core is laminated to envelope members that are non-absorbent and have good wet strength. In order for these envelope materials to support the wet core, the surface of the core, which is attached to the envelope, must remain integral to the remainder of the core through its thickness as in-plane shearing forces are applied, preventing separations from occurring within the core. In other aspects of this type of construction, the core is laminated to envelope members on opposite faces of the core, which then have forces applied that make these envelope members move relative to one another, again applying in-plane shearing forces to the core that they both are joined to. Wet shear strength in the absorbent member is also important in wipes and mop applications, in which scrubbing forces are applied to the working face of the absorbent and can cause internal shearing failure of the absorbent member if the wet shear strength is not sufficient. Additionally, wet strength can help these welted working faces of the absorbent avoid being scuffed and torn under friction.

In the case of airlaid core materials, which are typically introduced as roll goods or otherwise introduced from a package to the converting process for the absorbent article in question, there are several widely practiced methods for producing materials with substantial wet tensile and shear strength.

The airlaid process, widely practiced commercially, consists of two principal steps. The first step involves depositing the various fibers and other materials into a uniform continuous web. The second step is the bonding process, in which this web is bonded and given the mechanical properties of the final airlaid nonwoven material.

U.S. Pat. No. 4,600,462 teaches a process in which an unbonded web comprising cellulose fibers is sprayed with a latex binder, such as a latex of EVA (ethylene vinyl acetate) or other binding agent and water. The water distributes the binder to the fiber surfaces through the thickness of the web and then heat is applied to remove the moisture and set the binder. Various forms of latex bonded airlaid (termed "LBAL" in the industry) using similar processes are widely produced commercially and exhibit good mechanical properties including wet strength. While the complexities of mixing and introducing the latex, and of handling a fragile unbonded web that is wetted with latex, have largely been dealt with in a satisfactory manner in commercial production, the energy consumption required to dry the moisture and set the binder is very high. This not only incurs a costly energy input, but also requires a very capital-intensive through-air oven in order to provide the required energy input to the moving web at rates fast enough to support good production rates. There is a need for a process that provides good wet strength while avoiding the energy and capital costs and complexity of LBAL.

U.S. Pat. No. 5,231,122 teaches an airlaid composite comprising cellulosic fibers and two thermoplastic materials, each having different melting temperatures, at least one of which is a fiber. In one embodiment, the low-melting temperature thermoplastic is in the form of a sheath around fibers comprising the high-melting temperature thermoplastic. An unbonded airlaid web comprising these materials is then heated and brought to a temperature that melts the sheath material only, which forms bonds between the fibers in the airlaid material. In commercial practice of a process similar to this, it has been found that this material is dusty, and small amounts of latex binder are frequently added to the surfaces prior to bonding the web. This process, called Multibonded Airlaid ("MBAL" in the industry) is widely practiced commercially, producing airlaid webs that have good wet shear and wet tensile strength. As with the previous example, the energy input required to activate the bonding is still very high, incurring significant costs and complexity in terms of energy usage and capital involved with the large ovens necessary to impart this energy to the web at high production speeds.

In a variant of this process, U.S. Pat. Nos. 4,425,126 and 4,129,132, to Butterworth, et al., describe a fibrous material formed by combining thermoplastic fibers and wood pulp, heat fusing the combined fibers, and thereafter depositing a binder on the heat-fused web. Because the fibers are heat-fused prior to adding the binder, individual binder coated fibers for mixing with other fibers are not produced by this process. The same issues of energy consumption and complexity exist as with the previous examples.

There is a need for a bonding process for airlaid webs comprising cellulosic fibers that has a smaller energy input requirement and avoids the need for the large ovens required for LBAL and MBAL processes.

U.S. Pat. No. 5,866,242 teaches an airlaid material, sometimes referred to as a Hydrogen Bonded Airlaid, comprising cellulosic fibers, and optionally superabsorbent polymer that is bonded using heat and pressure to form hydrogen bonds. In commercial practice, this technology uses a heated calender roll to apply the pressure and heat required to form hydrogen bonds between the fibers. Compared to LBAL and MBAL, the energy input requirement to form strong bonds is significantly less using this method. This arrangement is much simpler to operate, and has significantly less energy consumption and requires much less capital expenditure than the ovens used in the LBAL and MBAL processes.

Hydrogen Bonded Airlaid, however, has relatively low wet tensile or shear strength, particularly if there is SAP present, which acts to debond the web as it hydrates and swells upon wetting.

There is therefore a need for a method of producing a material with improved wet strength requiring a lower energy input, thus desirably allowing the use of the heated calender means used in a Hydrogen Bonded Airlaid process, thus avoiding the complexity, capital cost and energy use of hot air bonding ovens. It is additionally desirable to achieve this as an add-on to a hydrogen bonded airlaid operation with a minimum of additional capital.

In an attempt by the applicants to accomplish this, bi-component fibers, comprising two thermoplastic materials with differing melting points, were blended with cellulosic fibers in a hydrogen bonded airlaid composite made on a commercial production machine using a heated calender bonding station. It was found that the calender station, operating at 170° C. that provided high production rates for the hydrogen bonded airlaid process, did not provide enough heat energy input to effectively activate the bi-component fiber unless the line was slowed to an undesirably low speed.

In a separate similar attempt by the applicants, fusible binders were dispersed in an airlaid hydrogen bonded composite in the form of finely divided powders, and bonded using a heated calender bonding station. Both polyethylene and EVA binders were tried. As in the previous trial, the calender on the production machine did not provide enough heat to effectively fuse the powders providing improved wet strength unless the line was slowed to an undesirably slow speed. The applicants believe that the heat of vaporization of moisture present in the web is causing the web to resist exceeding 100° C. until most of the moisture is driven off. These fusible binders and bi-component fibers activate at temperatures above 100° C.

There is therefore a need to introduce a wet strength agent to the hydrogen bonded airlaid that activates and forms wet-strength bonds at temperatures well below 100° C.

Notably, wax is a material that has a melting temperature in a range very favorable for processing using a heated calender. The use of wax in paper products is widely practiced. Wax is frequently used as a wet strength agent, and as a barrier to water penetration in structural materials, such as corrugated boxes. Alternatively, wax is frequently used as a barrier to liquid absorption, such as is taught in U.S. Pat. Nos. 3,654,064, 5,399,366, or 4,601,938. In some applications, wax is intended to be distributed through a paper product at very low add-on levels, which is accomplished by applying water emulsions of wax, and then later removing the water. This is taught by U.S. Pat. Nos. 7,300,547 and 4,987,632, both hereby incorporated by reference, as well as others, but in each case, the intended function of the wax is to inhibit or block water absorption. Similar to an LBAL process, it is presumed using this method in an airlaid material would require sufficient energy input and capital in the form of a large oven in order to evaporate the moisture from the emulsion and produce such a material at high line speeds. In U.S. Pat. No. 7,228,586, a wax coated paper is specified as an absorbent member in a multilayer scrubbing pad, however, there is no indication of high absorbency, particularly given the absence of SAP.

Thus, a need exists for a method of wax application for a hydrogen bonded airlaid material that confers improved wet strength while maintaining most of the absorbent capacity of the material.

SUMMARY OF THE INVENTION

In accordance with the present invention, an absorbent material comprises a blend of cellulosic fibrous material, typically wood pulp fibers, and superabsorbent polymeric material. The present absorbent material is provided in the form of a sheet having upper and lower surfaces, with a wax applied to the blend of materials so that the resultant sheet exhibits enhanced shear and wet tensile strength. Notably, by practicing the method of the present invention, the wax can be applied to the blend of cellulosic and superabsorbent materials with relatively low energy input, without unacceptably diminishing the absorbent characteristics of the blend.

Preferably, the wax is applied in a discontinuous distribution to the blended materials, such as during their compaction. It is believed that the wax, in molten form, preferentially wicks or flows to the regions of relatively high densification to form localized concentrations or greater penetrations of the wax into the regions of high densification. Thus, during use, the wax is believed to minimize the effect of wetting of hydrogen bonds at the regions of high densification, desirably enhancing the wet strength of the material, with the distribution of the wax, in a discontinuous fashion, acting to maintain the desired absorbency of the material.

Thus, the present invention contemplates an absorbent material, and a method of making the material, which exhibits improved wet strength, as well as desirably high absorbency. Because the material can be economically formed, the resultant material finds applicability for use in disposable absorbent articles, including hygiene and incontinent devices, as well as food pads, wipers, mops, and like products.

In one particularly preferred embodiment of the present invention, a substantially homogeneous blend of cellulosic fibrous material and particulate superabsorbent polymeric material is provided in the form of a sheet of absorbent material having upper and lower surfaces. Attendant to formation, such as by compaction with one or more calender rollers, the sheet of absorbent material includes regions of relatively high densification about the particles of superabsorbent polymeric material.

In accordance with the present invention, the sheet of absorbent material includes a wax, having a melting point less than 100° C., with the wax having a discontinuous distribution in the sheet of absorbent material. Notably, the construct includes localized concentrations of wax in at least some of the regions of relatively high densification of the sheet of absorbent material. It is believed that during manufacture, the molten wax tends to preferentially penetrate into the regions of higher densification of the composite structure, including those regions which are formed at the particles of superabsorbent polymer. It is believed that structural properties of the resultant material, including shear and tensile wet strength properties, are enhanced by cooperation of the wax with hydrogen bonds formed in the regions of relatively high densification, such that the wax acts to minimize the effect of wetting on some of the hydrogen bonds, creating improved wet strength.

In the preferred form, continuities of relatively higher concentrations of wax can be provided so that they extend in laterally spaced relationship to each other in a machine direction of the material. The absorbent material can be configured to define other patterns of regions of relatively high and low densifications, with the wax preferentially distributed in the regions of high densification.

Preferably, the absorbent material embodying the principles of the present invention exhibits a centrifuge retention value greater than 80% of a centrifuge retention value of a sheet of material having a like blend of cellulosic fibrous material and superabsorbent polymeric material, without any wax content. Material formed in accordance with the present invention preferably exhibits a centrifuge retention value which is greater than 30 grams/grams per weight percent, in decimal form, of superabsorbent polymeric material. Hydrogen bonding within the sheet of material provides the sheet with a dry tensile strength of at least 10 Newton/50 mm.

Notably, non-uniform distribution of the wax within the sheet of material has been found to desirably enhance the wet strength characteristics of the material without unacceptably diminishing the absorbency of the material. Thus, the non-uniform distribution of the wax can be effected such that continuities of relatively larger concentrations of the wax extend in at least one of thickness, length, and width directions of the sheet of absorbent material. In one form, continuities of the relatively higher concentrations of the wax can be formed to extend in laterally spaced relationship to each other in a machine direction of the sheet of absorbent material.

A method of forming the present absorbent material includes the steps of airlaying a blend of cellulosic fibrous material and superabsorbent polymeric material, and compacting the blend to form a sheet of absorbent material having upper and lower surfaces. The present method further comprises applying a wax to the blend, to produce a sheet of material having the desired performance characteristics. Heat is preferably applied to the blend during the compacting step, with the present method contemplating that compaction is effected by cooperating calender rollers. Efficient application of the wax to the blend of materials can be effected by application of the wax to at least one of the calender rollers, so that the molten wax is applied to the blend.

In the preferred practice of the present invention, a substantially homogeneous blend of cellulosic fibrous material and particular superabsorbent material can be airlaid, with compaction of the blend effected to form a sheet of absorbent material having upper and lower surfaces. Attendant to compaction, regions of relatively high densification are formed about the larger particles of superabsorbent material.

The present method further contemplates applying a wax, having a melting point less than 100° C., to the sheet of absorbent material during the compacting step. In accordance with the present invention, the wax is applied in a discontinuous distribution in the sheet of absorbent material to form localized concentrations of the wax, in at least some of the regions of relatively high densification of the sheet of absorbent material. Again, it is believed that the molten wax tends to preferentially penetrate into those regions of the web of relatively high densification, with the wax thereafter functioning in the finished absorbent material to cooperate with the hydrogen bonds formed at the regions of relatively high densification, thus acting to desirably enhance the wet strength characteristics of the material.

Thus, in one aspect of this invention, a material is provided comprising cellulose fibers, superabsorbent polymer, and wax in quantities from 0.1% by weight to 20% by weight and more preferably from 2% to 15% by weight, exhibiting non-trivial wet tensile and wet shear values with centrifuge retention values within 20% and more preferably within 10% of those exhibited by a similar material made by a similar process without the wax.

In another aspect of the invention, the aforementioned material can yield centrifuge retention values greater than 30 g/g per weight percent SAP content (expressed as a decimal). In another aspect of the aforementioned material, the material has both hydrogen bonds and wax content. In another aspect of the invention, the aforementioned material is formed on an airlaid machine and bonded using a heated calender. In another aspect of this invention, materials described in either aspect above are provided with basis weights ranging from 50 gsm to as high as 1500 gsm, more preferably with basis weights ranging from 75 gsm to 700 gsm. In another aspect of this invention, materials described in either aspect above are provided with SAP content ranging from 0% to as high as 70%, more preferably with SAP in the range of 0% to 55%. In another aspect of this invention, the three-dimensional structure of the deposition of the wax in the material is such that on a small scale, within the material, the wax content varies producing locations with higher wet strength and other locations with higher free-swell capacity. In another aspect of this invention, the wax penetrates at differing amounts and distances through the thickness of the material in different locations, producing locations that generate useful wet shear for the sheet as a whole while other locations provide relatively unaffected absorbency.

Other features and advantages of the present invention will become readily apparent from the following detailed description, the accompanying drawings, and the appended claims.

DETAILED DESCRIPTION OF THE INVENTION

Figure 1:
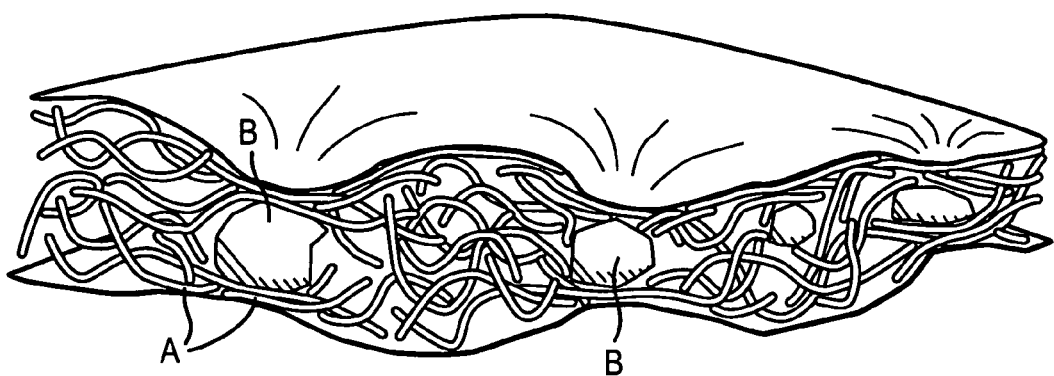
FIG. 1 is a diagrammatic, cross-sectional view of a composite absorbent material including cellulosic fibrous material, and granules of superabsorbent polymer.

While the present invention is susceptible of embodiment in various forms, there is shown in the drawings, and will hereinafter be described, presently preferred embodiments, with the understanding that the present disclosure is to be considered as an exemplification of the invention, and is not intended to limit the invention to the specific embodiment illustrated.

For purposes of this disclosure, a hydrogen bonded airlaid material is any nonwoven comprising cellulosic fibers and optionally superabsorbent polymer that is formed by suspending individualized fibers in an air-stream and depositing them in an undensified web and then applying heat and pressure to the web to form hydrogen bonds, increasing the density and strength of the material compared to its undensified state. No chemical or thermoplastic binder materials are used. A preferred method of applying heat and pressure is to use a heated calender roll.

Successfully introducing a fusible wet strength bonding aid to a hydrogen bonded airlaid process that uses a heated calender to form hydrogen bonds requires that several problems be solved. A material must be selected that has a melting temperature well below 100° C. in order to be sufficiently melted in the process, particularly at high web speeds. As stated earlier, wax was found to be a useful material.

Suitable waxes may be of a variety of chemistries from the families of petroleum waxes, mineral waxes, animal waxes, vegetable waxes, and synthetic waxes. Generally, the desirable properties include exhibiting a melting temperature well below 100° C., being a solid at any expected ambient temperatures, and being insoluble in water. Paraffin wax is particularly suitable, due to its low cost, hydrophobic nature, and the fact that in pure grades, it is used in conjunction with food packaging products. Paraffin melts around 40°-60° C.

U.S. Pat. No. 7,300,547, hereby incorporated by reference, identifies a number of different waxes that can be employed for practice of the present invention, with the understanding that those waxes having a melting point less than 100° C. are preferred, with those having a melting point much less than 100° C. being most preferred. The reason for this is it is believed that the heat of vaporization of the moisture content in the fibrous web makes the web resistant to having its temperature elevated over 100° C. until most of the moisture has been expelled from the web. By selecting waxes exhibiting a melting point well below this threshold allows use of a heated calender roller to operate efficiently as a heat source for practice of the present invention. On balance, it is desired that melting points be greater than about 30° C., in order to have the selected wax remain solid at most room temperatures. Preferably, the selected wax will exhibit insolubility in water, and exhibit hydrophobicity. The above-referenced U.S. Patent lists waxes with melting temperatures above this preferred range, so waxes with smaller molecular weights in those families of waxes are necessary to keep within the desired range of melting temperatures.

Paraffin can be introduced into the process in any number of ways, including blending with the fibers during the airlaying process in a powdered form. A particularly desirable way for paraffin to be added is to apply it to the calender surface in a melted form. The melted wax is then transferred to the web in the calender nip. In this way, the heat of fusion of the wax has already been introduced to the system and the limited heat transfer from the calender at the nip is all being applied to heating the web rather than melting the paraffin.

An unexpected discovery was made by the applicants when wax was introduced in the form of a waxed top tissue brought into the process upstream of the bonding calender, replacing a conventional top tissue. The heated calender normally forms strong hydrogen bonds between the conventional top tissue and the cellulose fibers in the web which are sufficient enough to be destructive to the tissue if it is attempted to remove the tissue from the finished sheet. While it would have been a convenient method of introducing wax into the system in a very controlled manner, it was found that the waxed tissue formed extremely weak lamination bonds to the web. Without being bound by any particular theory, it is believed that wax is not a strong binder by itself, and that if it is present on the cellulosic fiber surfaces prior to bonding, the strong hydrogen bonds do not form.

To further investigate this phenomenon, an unbonded mat of cellulose and SAP was removed from the airlaid line and densified in the laboratory, without forming hydrogen bonds. With the top tissue removed, wax flakes in the amount of 8% by weight of the material were spread uniformly on the top of the mat of cellulose fibers and SAP. The material was then placed on a laboratory hot plate and compressed until the wax melted into the fluff mat and distributed itself through the fibers. The sample was removed and kept compressed until the wax hardened and allowed to sit for 1 hour. The resulting material had no reason to have formed any particular interfiber hydrogen bonding, but a subjectively good distribution of wax. The dry tensile of the material was very weak compared to the typical hydrogen bonded web, and while much of the material was rendered water-repellent (an indication of the uniformity of the wax distribution), there was no measurable wet tensile or wet shear strength generated by the wax bonding. While not being bound by any particular theory, it is believed that the wax works in cooperation with the hydrogen bonds to give them wet strength, instead of acting as a binder by itself, possibly by a mechanism as simple as excluding moisture from contacting some of the hydrogen bonds allowing them to maintain their integrity after the web is wetted.

A second problem to be solved in adding wax to the web after it is formed is that the wax needs to be distributed through the thickness of the web in order to provide wet shear strength. In order to retain water absorbency of the composite, however, the wax also needs to be added in quantities that are a minor fraction of the wax saturation capacity of the web. It would be relatively easy to add wax in excess quantities and it would saturate the web, penetrating through it very effectively, but the resulting material would be rendered largely non-absorbent. Fortuitously, the web in the bonding calender nip is highly compressed, and then rebounds to some degree as it exits the calender nip. Under the instantaneous compression, even smaller amounts of melted paraffin introduced from the surface of the calender roll very efficiently wick or are pressed through the highly densified web, and apparently do not interfere with the hydrogen bonding since the dry tensile strength is not observed to be affected. Testing was done on hydrogen bonded airlaid samples with 30% SAP at a density of 0.28 g/cc and it was found that the material was saturated with paraffin at 1.7 g of paraffin per gram of hydrogen bonded airlaid. Materials of the current invention include wax add-on in amounts of less than 12% of that saturation capacity, and more preferably less than 9%.

Another unexpected discovery is the spontaneous formation of a particular structure that is theorized to enable the combination of wet strength and absorbency to exist. FIG. 1 is a diagrammatic view of a cut section of hydrogen bonded airlaid material. SAP granules (B) relatively large relative to the gap in the calender nip and as the granules wedge through the bonding nip, they cause adjacent fibers (A) to become highly compressed, and subjective examination suggests more highly bonded. A top tissue peeled from this type of web shows subjectively stronger bonding at the sites of these larger SAP granules. This bonding results in depressions in the surface of the sheet coincident with larger SAP granules contained in the material.

Figure 2:
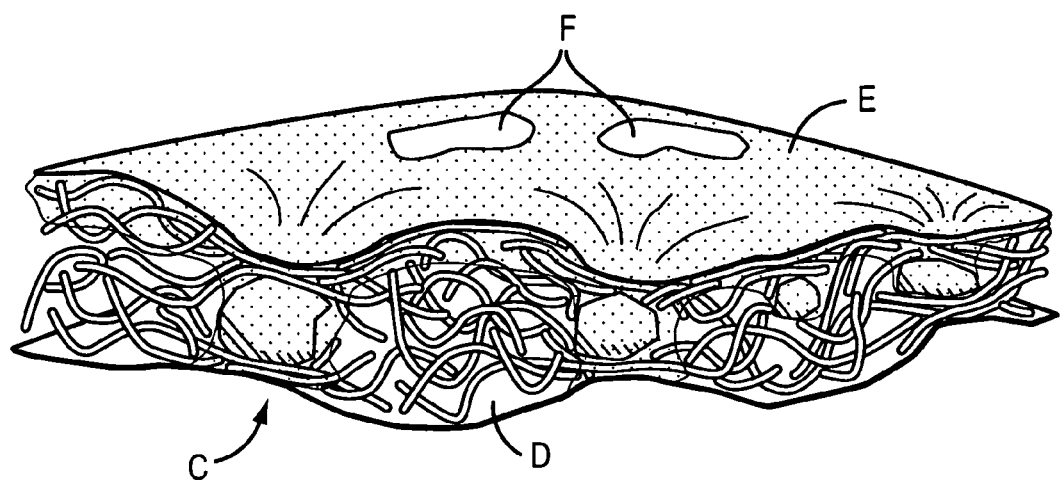
FIG. 2 is a diagrammatic, cross-sectional view similar to FIG. 1 illustrating an absorbent material comprising fibrous cellulosic material, particular superabsorbent material, and a wax which has been applied to the structure.

FIG. 2 is a diagrammatic view of a cut section of a piece of hydrogen bonded material, with melted wax added from the calender roll surface that corresponds to the upper surface. The distribution of wax in the material of the current invention is easily visible when the material is wetted with 0.9% saline solution containing small amounts of food coloring. The extent of the wax is represented in the sketch by the dark shading. Wax concentration is heavier on the upper surface (E), although it is not uniform, with discreet areas showing little wax (F). Likewise penetration in the thickness direction is highly non-uniform, with most-penetrated areas appearing adjacent to the highly bonded SAP granule locations (C) and with the areas with the least bonding showing essentially no wax penetration (D).

To investigate the effect of the structure of the material of the present invention, Example 3 below, with 9% wax content by weight, the material was heated with a hot air gun, which re-melted the wax and distributed it more uniformly through the material, disrupting the structure of the material of the present invention. Average centrifuge retention was reduced from about 9.5 g/g to about 3.4 g/g (See Table 2). Without being held to any particular theory, the non-uniformity of the structure of the present invention appears to enhance the absorbency of the material.

One method of quantifying the effect of the wax on the absorbency is to compare the centrifuge retention of a material made according to the present invention, to the same material without the wax, and comparing the percentage loss in retention as a result of adding wax. A method of quantifying the overall absorbency is to measure absorbency in terms of centrifuge retention, and divide that value by the percent SAP content (in decimal form). Wet strength materials with a high retention relative to their SAP content are desirable.

While not being bound by any particular theory, the wax appears to be fortuitously preferentially penetrating into the most heavily bonded locations, i.e., regions of relatively higher densification, where if the wax was is actually working in conjunction with the hydrogen bonding, it can generate the greatest wet strength. Fully penetrated regions (C) provide continuities of wet strength regions in the thickness direction (Z-direction) enabling there to be wet shear strength, and continuities in the in-plane direction (X-Y direction) provide wet tensile strength, and discontinuities (D) and (F) provide regions of unaffected absorbency. Subjectively, the heavier wax application on the upper surface of the web E can be useful to give that surface additional integrity against wet scuffing, and help contain SAP from leaking out past that surface under external mechanical inputs, and if heavy enough, serve as a relatively liquid impermeable surface keeping wetness away from anything that touches this surface after the web is wetted. As an additional variant, such a surface can be created on both sides by applying wax from both top and bottom calender rolls.

Figure 3:
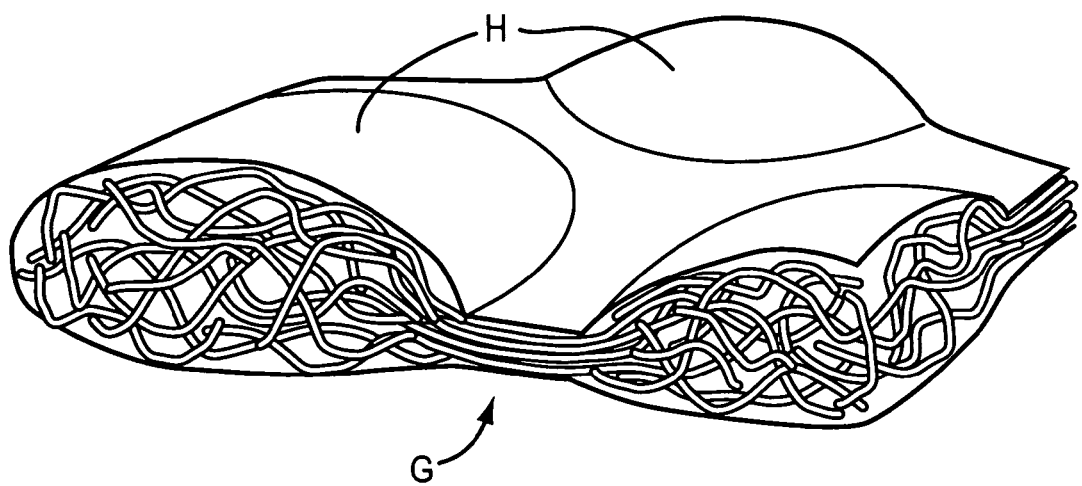
FIG. 3 is a relatively enlarged, cross-sectional view illustrating regions of relatively high and low densification in a fibrous absorbent structure.

To further increase absorbency, wax can be applied in a discontinuous manner, such as in stripes (i.e., laterally spaced regions extending in a machine direction), etc. Another method by which this can be accomplished is by use of an embossed upper calender, and applying the wax only to the surfaces of the calender roll that create high-density locations in the sheet, while not applying it to the relieved portions of the roll. FIG. 3 is an illustration of the wax distribution in an embossed pattern that uses a pattern of non-densified circles (H) surrounded by highly densified regions (G). Thus, the material of the present invention preferably includes densified locations having wax (G), while non-densified regions have no wax added, as they do not contact the calender surface and retain full absorbency. In other words, the present invention contemplates that the sheet of absorbent material includes regions of relatively high densification particularly about particles of superabsorbent polymeric material, with localized concentrations of the wax in at least some of these regions of relatively high densification. When the sheet of absorbent material is formed to define a pattern of regions of relatively high and low densification, the wax is preferentially distributed in those regions of high densification.

As summarized earlier, the material of the present invention is contemplated to comprise cellulosic fiber, SAP, and wax and has a basis weight in the range of 50 gsm to 1500 gsm, more preferably being in the range of 75 gsm to 700 gsm. The SAP content of the material of the present invention ranges from 0% to 70% but is more desirably in the range of 0% to 55% and even more desirably is in the range of 15% to 35%. Wax content is in the range of 0.1% by weight to 20% by weight, but is more desirably in the range of 2% to 15%. The material can preferably have a carrier tissue and more preferably may have a tissue on the top of the sheet as well. The calender bonding for the material of the present invention may be a smooth calender roll or optionally an embossed calender.

Cellulosic fibers that can be used in the process of the present invention are well known in the art and include wood pulp, cotton, flax, and peat moss. Wood pulp is usually preferred. Pulps can be obtained from mechanical or chemi-mechanical, sulfite, kraft, pulping reject materials, organic solvent pulps, etc. Both softwood and hardwood species are useful. Softwood pulps are preferred. The pulp is most desirably provided in a package that can be processed by the airlaid equipment used to create the material of the present invention.

Superabsorbent polymers (SAP) are well known in the art. As used herein, the term "superabsorbent material" means a substantially water-insoluble polymeric material capable of absorbing large quantities of fluid in relation to their weight. The superabsorbent material may be in the form of particulates, fibers, flakes, granules, or aggregates. Exemplary and preferred superabsorbent materials include salts of cross-linked polyacrylic acid such as sodium polyacrylate. Superabsorbent materials are commercially available (e.g., from Stockhausen GmbH, Krefeld, Germany). A wide range of types of are used in various disposable absorbent products; the appropriate grade depends very much on the required absorbency characteristics of the end use article. Those skilled in the art can select the optimal grade for the particular end use design.

The absorbent material of the present invention can incorporate an optional carrier tissue, and another optional tissue layer on top of the web. Suitable tissue materials for use are well known to those of ordinary skill in the art. Preferably, such tissue is made of bleached wood pulp and has an air permeability of about 273-300 CFM. Tissue for use in air-laying absorbent materials is commercially available (e.g. From Cellu Tissue in East Hartford, Conn.).

The absorbent material of the present invention can be configured in a uniform manner or can be configured with many strata of differing compositions of cellulose and/or superabsorbent. Those skilled in the art of making airlaid absorbent materials can design the optimal configuration for any given end-use product application. A preferred material may be configured with a top tissue and a carrier tissue, and have a substantially uniform homogeneous mix of cellulosic fibers and SAP.

A typical density for a smooth-calendered material, according to the present invention, may be in the range of 0.20 g/cc to 0.50 g/cc, and more preferably between 0.25 g/cc and 0.40 g/cc. A typical density for an embossed material will be highly dependent on the embossed pattern and the composition of the material, with the one constraint being that the highly densified areas generate sufficient hydrogen bond strength to provide the required mechanical properties of the sheet.

The bonding apparatus to produce the hydrogen bonding can consist of any apparatus capable of applying sufficient heat and pressure to do so, preferably in a continuous process, in a manner appropriate for the process and end use. More preferably, it consists of a heated calender roller, with roll temperatures above 100° C. and, with the roller capable of applying pressures sufficient to yield web densities in the specified ranges contemplated for the material of the present invention, discussed earlier.

Figure 5:
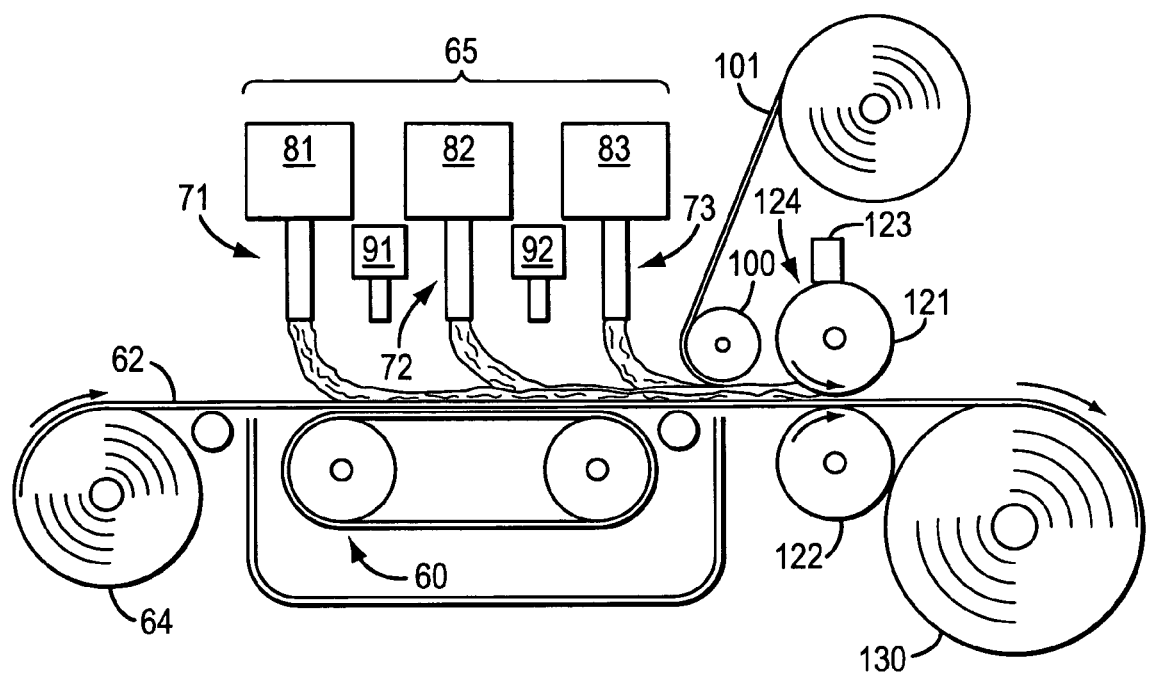
FIG. 5 is a diagrammatic view of an apparatus for practicing the method of the present invention.

FIG. 5 illustrates an apparatus for practicing a method of forming an absorbent material in accordance with the present invention.

The process described below with reference to FIG. 5 accommodates the incorporation of a carrier layer in the absorbent material. To this end, tissue 62 is unwound from a tissue web roll 64 and directed over the endless screen 60 as shown in FIG. 5. A series of forming heads 65 is provided over the endless screen 60 to deposit cellulosic fibers. In the preferred form of the process, the series includes a first forming head 71, a second forming head 72, and a third forming head 73. A lesser or greater number of forming heads may be provided depending on how many layers of material are to be laid down.

The cellulosic fibers preferably include 100% southern pine Kraft processed pulp. The fibers are processed using a conventional hammermill (not illustrated) to individualize the fibers. The individualized fibers are preferably blended with superabsorbent material, typically in the form of granules, flakes or particles (herein collectively referred to as particulate superabsorbent material) in separate blending systems supplying the forming heads 71 and 72. The forming head 71 is connected with a blending system 81, and the forming head 72 is connected with a blending system 82. In some systems, the pulp fibers and particulate superabsorbent are blended and conveyed pneumatically into the forming heads 71 and 72. The forming head 73 may have a blending system 83, but the blending system 83 is not operated to blend superabsorbent particles if the top layer of the absorbent material is to be made without superabsorbent. In other systems, the pulp fibers and superabsorbent granules or particles are conveyed separately to the forming heads and are blended together in the forming heads. Chemical binding agents and heat-set bonding agents are preferably not added during fiber processing or during the blending of the fibers with the superabsorbent material.

The blending and distribution of the materials can be controlled separately for each forming head. For example, in some systems, controlled air circulation and winged agitators in each blending system produce a substantially uniform mixture and distribution (of the pulp fibers and superabsorbent particles for blending systems 81 and 82, and of the pulp fibers alone for blending system 83).

The superabsorbent particles can be either thoroughly and substantially homogeneously blended throughout the absorbent core portion of the structure being produced, or contained only in a specific layer or layers by distributing the superabsorbent particles to selected forming heads.

If desired, the superabsorbent particles can be separately discharged from separate forming heads 91 and 92 as individual layers of 100% superabsorbent. In such an optional configuration, the superabsorbent particle forming heads 91 and 92 are employed, then additional superabsorbent particles can also still be blended in the blending systems 81 and 82. Alternatively, only pulp fibers exclusively can be conveyed to and through the blending systems 81 and 82 and the forming heads 71 and 72, respectively, when superabsorbent material is discharged from the forming heads 91 and 92.

The material from each forming head is deposited with vacuum assist onto the tissue web or carrier layer 62, to form a layered absorbent web. The layered absorbent web can be, but not need be, compacted with the help of a compaction roll 100.

An optional additional layer of tissue 101 can be combined with the top surface of the web, shown in this particular embodiment being combined at the compaction roll 100.

In the presently contemplated preferred embodiment of the process illustrated in FIG. 5, the moisture content of the web is increased using a humidification system (not illustrated) which controls the humidity in the airstream that transports cellulosic fiber from the hammermills to the forming heads 65.

The web is then compacted between a pair of heated calendering rollers (upper roller 121 and lower roller 122). This increases the density of the web. In a preferred embodiment, a second tissue web (not illustrated) is directed on the upper surface of the web into the nip between the upper roller 121 and lower roller 122 being integrated into the web.

In a preferred embodiment, the calender rollers 121 and 122 are steel, with the upper roller being a smooth roller, and the lower roller 122 also being steel and has an engraved surface which has a three-dimensional configuration or impression of a linen-like fabric. The linen pattern serves to embed the bottom tissue layer 62 into the bottom of the absorbent material improving the lamination strength. Preferably, the surface relief of the engraved surface is greater than 5% of the thickness of the carrier tissue 62.

One form of the linen roller used to make samples of the invention described hereinafter in the section titled "EXAMPLES" is a linen pattern designated by the design 203CRE engraved by BF Perkins in Rochester, N.Y.

Each roller 121 and 122 is preferably heated to a temperature between 100° C. and 200° C. and more preferably around 150° C. The weight of the upper roller 121 bears on the layered web. Additional force may be provided with conventional hydraulic actuators (not illustrated) acting on the shaft of the roller 121. In one form of the invention process, the web is compacted between rollers 121 and 122 under a preferred load of between about 160 and 2284 pounds force per lineal inch of transverse web width, but preferably is loaded to whatever force is required to yield the desired density of the resulting web, which varies in the context of the present invention. An alternative method of set-up is to set the rollers to a rigid fixed gap and the amount of pressure that is applied by the web against the rolls 121 and 122 is dependent on the basis weight and caliper of the web as it relates to the gap setting.

The heated compaction increases the density of the web and effects the establishment of hydrogen bonding of the pulp fibers to each other within the layers of the absorbent core portion, as well as to the tissue layer 62 and optional tissue layer 101. The compaction also increases the physical entanglement of the fibers. This increases the integrity and strength of the finished absorbent material. It is believed that hydrogen bonding needs to be effected prior to coating the fibers with wax, which it is believed inhibits the formation of the necessary hydrogen bonding. As noted, compaction of the blend of cellulosic fibers and particulate superabsorbent material results in regions of relatively high densification about the particles of superabsorbent material, with localized greater penetrations or concentrations of wax being provided in at least some of these regions of relatively high densification.

In a preferred embodiment, paraffin wax 124 is applied to the calender roller 121 in a uniform liquid coating by any appropriate metering device 123 which then is transferred to the upper surface of the web at the calender nip. In one embodiment, the metering can be effected by placing solid wax in contact with the calender roller surface and allowing it to melt the wax according to the rate of heat transfer, thus forming the necessary film. In alternative embodiments wax can be applied to the undensified web in a liquid form or can be mixed in with the fibers at the forming heads 65 in the form of flakes. Applying the wax in the form of a liquid at the calender is thought to transfer a maximum of heat energy to the system (since the wax is already melted) but it allows the hydrogen bonds to form without interference from the wax. In alternative embodiments, the metering device 123 can apply the wax 124 to the calender roller 121 in any desired pattern, leaving some areas uncoated, or coated with differing thicknesses of wax. In an alternative embodiment, the upper calender roller 121 is engraved with an embossed pattern comprising raised and recessed portions. The wax is only applied as a liquid film to the raised portions and as a result is transferred to the web in the calender nip only in the locations of the resulting high-density embossments at G, as illustrated in FIG. 3. Thus, the embossed calender roller forms regions of relatively high densification in the sheet of material, with wax being preferentially applied to the pattern on the calender rolls so that the wax is preferentially distributed to regions of relatively high densification in the sheet of absorbent material.

In a preferred embodiment, the web is wound to form a finished roll 130.

Test Procedures

Three tests are used to quantify the material of the present invention. Wet tensile is used to quantify the strength of the wet composite to tensile forces in-plane. This also relates to tearing when wet. Wet shear is used to quantify the strength of the wet composite against in-plane shearing forces such as those generated by differential movement of envelope materials that are attached to opposite faces of the composite material freeswell and centrifuge retention are used to quantify the absorbency of the composite material.

Wet Tensile: A 240 mm×50 mm sample is cut using an Atom Model SE 20C die press from Associated Pacific Company of Camarillo, Calif. and an appropriately sized cutting die. The sample strips are placed on a flat surface and 5 ml of 0.9% saline is slowly applied to the center of each using a graduated syringe or alternatively a graduated cylinder. The rate at which the strip will absorb the liquid should not be exceeded. In the case of low basis weight materials, liquid addition should stop before the wetness reaches the ends of the strip where the tensile tester jaws will grip it. The liquid should be allowed to equilibrate in the sample for 5-minutes. A tensile test is then done on the strip using a Zwick Model Z005 tensile tester from Zwick/Roell in Ulm, Germany, or the equivalent. The test starts at a 200 mm jaw separation. The sample is placed in the jaws and the force is zeroed. The tester program then applies 0.1N pre-load to the strip at a rate of 100 m/min and then proceeds to pull the sample at a rate of 100 mm/minute until failure, recording the maximum force in Newtons per the 50 mm wide test strip. Samples with a wet tensile strength less than 1N/50 mm are defined as being trivial for the purposes of this patent.

Dry Tensile: Similar to the wet tensile test, except the pre-load force is 2N and the step of adding saline to the sample is eliminated.

Figure 4:
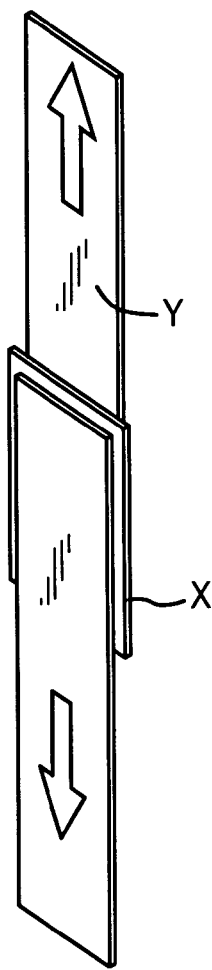
FIG. 4 is a diagrammatic view illustrating shear testing of a sample of absorbent material.

Wet Shear: As illustrated in FIG. 4, a 50 mm×50 mm square sample is cut using an Atom Model SE 20C die press from Associated Pacific Company of Camarillo, Calif. and an appropriately sized cutting die. A strip of highly adhesive Spectape ST 501 Double Sided tape in a slit width of 2-inches is cut to a length of 6-inches and the square sample (X) is carefully affixed to one end of the strip of tape (Y) with about 1 mm of sample extending past the edge of the tape on three sides. A second 6-inch strip of tape (Y) is affixed to the opposite surface of the sample in the similar manner as the first, except extending in the opposite direction. At no point do the two pieces of tape touch one another, due to the 1 mm extensions of the sample past the edges of the tape. This assembly is placed between two 0.5-inch thick plates of Lexan or the equivalent and placed on the die press and pressed at a pressure setting of "2" which applies a high compression load to the tape sealing it very securely to the sample surfaces. This is to insure that the tape to sample surface bond will not fail before the material itself in shear.

The sample assembly is then placed in a small weigh pan containing 0.9% saline solution for 5-minutes equilibration time. The sample is then carefully removed from the solution and placed in the Zwick Model Z005 tensile tester jaws and the wet tensile program described above is run. The tensile tester via the tape attached to the upper jaw pulls one face of the sample square upwards in shear and the other face of the sample is pulled downwards in shear via the tape attached to the lower jaw. Shearing forces are parallel to the faces of the material sample causing them to slide past one another. The maximum force required to shear the sample apart is recorded. This is recorded in units of Newtons per 25 $cm^2$. Trivial values are defined here as those that fail at values less than the 0.1N pre-load force or fall apart when transferring the sample from the weigh pan bath to the tensile tester.

Freeswell and Centrifuqe Retention 50 mm circular samples are cut from the sheet using an Atom Model SE 20C die press from Associated Pacific Company of Camarillo, Calif. using an appropriately sized cutting die. These are weighed to the nearest 0.01 g using a Sartorius lab balance or the equivalent. The samples are placed in T-sac brand No. 3 Tea bags available from T-sac GmbH located in Hanover, Germany and the top is stapled shut using three staples. Three T-sacs, which do not contain samples, are also stapled shut, which are used as blanks to establish wet and centrifuged tare weights for the relatively consistent bags.

The sample bags and blank bags are placed in a pan filled with 0.9% Saline solution for 30-minutes and then hung vertically from a rack for 10-minutes. They are weighed, and then placed in a Thomas spin dryer available from the Thomas Company in Neunkirchen, Germany, powered with a Reliance Electric Model SP-12 AC drive set to yield 1400 RPM and a centrifugal acceleration of 250G. Any suitably large centrifuge unit yielding that acceleration could be substituted. Samples are spun for 3-minutes and then weighed. The weight of the wet sample bag, minus the average weight of the three wet blanks, minus the weight of the dry sample, all divided by the weight of the dry sample, is the free swell capacity in units of grams absorbed per gram of sample. Similarly, the weight of the centrifuged sample bag, minus the weight of the dry sample, minus the average weight of the centrifuged blank bags, all divided by the weight of the sample is the centrifuge retention in grams retained per gram of sample.

EXAMPLE 1

A 175 gsm airlaid composite was made on a DanWeb airlaid line with 6 forming heads comprising Rayfloc J-LDE pulp fiber from Rayonier and blended generally uniformly with approximately 27% Sumitomo SA65s SAP. Additionally 17 gsm tissue from Cellu tissue was bonded to the upper and lower surfaces of the sheet. This web was calender bonded with a heated calender roll at a heating oil temperature of 170° C. at a line speed of 155 m/min to a density of 0.30 g/cc. This material was tested for wet shear and wet tensile. Since no wax was applied to Example 1, this serves as a control to which to compare examples 2-5.

EXAMPLE 2

With the airlaid line still set up to produce Example 1, a block of Gulf Wax® brand paraffin that had been formed into a cake with one edge ¼ inch thick by 6 inches wide was applied to the surface of the upper heated calender roll. A film of melted wax formed on the surface of the top calender roller that was then carried into the calender nip and transferred into the highly compressed web. The block was pressed against the calender roller with pressure sufficient to produce a wax add-on of approximately 6% by weight.

EXAMPLE 3

With the airlaid line still set up to produce Example 1, a block of Gulf Wax® brand paraffin in a ¾ inch×4½ inch block was applied to the surface of the upper heated calender roller under light pressure. A film of melted wax formed on the top calender roller that was then carried into the calender nip and transferred to the web at this bonding point. The pressure of the wax block against the calender was sufficient to produce a wax add-on of approximately 9% by weight.

EXAMPLE 4

With the airlaid line still set up to produce Example 1, a block of Gulf Wax® brand paraffin in a ¾ inch×4½ inch block was cut using a hacksaw so it would apply 6 mm stripes of wax to the calender with 12 mm gaps between the stripes when held against the calender roll with light pressure. These stripes of wax were carried into the calender nip and applied to the web as it bonded, still in stripes. The pressure of the wax block against the calender roll was sufficient to produce a wax add-on of approximately 7%.

EXAMPLE 5

With the airlaid line still set up to produce Example 1, a ¾ inch block of Gulf Wax® brand paraffin was applied similar to Example 4, except it applied 6 mm stripes of wax with 6 mm gaps between the stripes. A pressure of the wax block against the calender was sufficient to produce a wax add-on of approximately 5%.

EXAMPLE 6

A 300 gsm material with 15% SAP was made on a Dan Web airlaid line with 6 forming heads comprising Rayfloc J-LDE pulp fiber from Rayonier, and blended substantially uniformly with approximately 15% Sumitomo SA65s SAP. Additionally, 17 gsm tissue from Cellu tissue was bonded to the upper and lower surfaces of the sheet. An embossed calender roller with a pattern of 5.5 mm circular holes in a hexagonally close packed configuration with 6.25 mm center distances along the minor axis was used to bond the material. The resultant circles were undensified and the regions between them were highly densified at a sufficient pressure, resulting in a material exhibiting approximately 0.18 g/cc in density overall. Web speed was 100 m/min. A ¾ inch block of Gulf Wax® brand paraffin was pressed lightly against the surface of the calender roller applying wax to only the raised areas between the circular holes. This pattern was transferred to the web, applying wax to the densified regions between the circular "pillows". The wax block pressure applied to the calender was sufficient to produce approximately 3% paraffin add-on.

EXAMPLE 7

To examine how the distribution of the wax in the material of the present invention affects absorbency, Example 3 material was heated with a hot air gun, which melted the wax allowing it to more uniformly distribute through the material, and thus reducing the effectiveness of the nonuniformity of the present invention in preserving absorbency.

Examples 1 through 5 were tested for wet tensile and wet shear. Average values are reported in Table 1

TABLE 1

| Configuration | Wax Add-On (%) | Wet Tensile (N/50 mm) | Wet Shear (N/50 mm square) |
|---|---|---|---|
| Example 1 (not of the present invention) | 0 | 0 | 0 |
| Example 2 | 6% | 2.9 | 1.5 |
| Example 3 | 9% | 6.0 | 2.9 |
| Example 4 | 7% | 3.5 | 7.1 |
| Example 5 | 5% | 4.1 | 4.6 |

Samples were then measured for centrifuge retention. A single 200 mm×300 mm hand sheet was cut from each example material which contained a broad band of waxed material of the present invention down the center and areas adjacent to the band where wax was not applied. (Qty 10) centrifuge retention samples were taken from each hand sheet, with 5 of these taken from the waxed strip and 5 taken as a control from the areas where wax was not applied. Average centrifuge retention values for each example taken from the wax band are compared to average retention values for their respective control regions where wax was not applied to understand how the wax of the present invention affects centrifuge retention compared to the similar material without the wax. These values are reported in table 2.

TABLE 2

| Configuration | Average Centrifuge Retention Area Containing Wax (g/g) | Average Centrifuge Retention Control Area, without Wax (g/g) | Waxed Region Retention/ Unwaxed Control Retention (%) |
|---|---|---|---|
| Example 2 | 9.6 | 10.9 | 88% |
| Example 3 | 9.5 | 9.9 | 96% |
| Example 4 | 9.0 | 9.2 | 99% |
| Example 5 | 8.7 | 10.4 | 83% |
| Example 7 | 3.4 | 9.2 | 37% |

It can be seen that by disrupting the structure of the current invention, the centrifuge retention of Example 7 is diminished significantly. The centrifuge Retention values from Table 2 for the waxed portions of the hand sheets are divided by the recipe values for the SAP content of the material, expressed as a decimal fraction of the total weight (including wax add-on weight.) These are reported in Table 3 below:

TABLE 3

| Configuration | Centrifuge Retention (g/g per percent SAP) |
| --- | --- |
| Example 2 | 38.5 |
| Example 3 | 38.3 |
| Example 4 | 35.9 |
| Example 5 | 33.7 |
| Example 7 | 13.6 |

From the foregoing, it will be observed that numerous modifications and variations can be effected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. An absorbent material, comprising:
a substantially homogeneous blend of cellulosic fibrous material and particulate superabsorbent polymeric material, in the form of a sheet of absorbent material having upper and lower surfaces, said sheet of absorbent material including regions of relatively high densification formed at particles of said superabsorbent polymeric material,
said sheet of absorbent material including a wax having a discontinuous distribution in said sheet of absorbent material, including localized concentrations or penetrations of said wax in at least some of the regions of relatively high densification of said sheet of absorbent material, said wax having a melting point less than 100° C.,
wherein said sheet of absorbent material defines a pattern of regions of relatively high and low densification, said wax being preferentially distributed in said regions of high densification, said sheet of absorbent material having a basis weight in the range from about 75-700 gsm, with said superabsorbent polymeric material in a range of about 0-55%, by weight, and said wax in a range of about 2-15%, by weight.

2. An absorbent material in accordance with claim 1, wherein:
continuities of relatively higher concentrations of said wax extend in laterally spaced relationship to each other.

3. An absorbent material, comprising:
a blend of cellulosic fibrous material, superabsorbent polymeric material, and wax, in the form of a sheet of absorbent material having upper and lower surfaces,
wherein said sheet of absorbent material exhibits a centrifuge retention of at least 30 grams/grams per weight percent, in decimal form, of said superabsorbent polymeric material,
wherein said absorbent material has a non-uniform distribution of wax, with continuities of relatively higher concentrations or penetrations of said wax extending in at least one of thickness, length and width directions of said sheet of absorbent material, said sheet of absorbent material having a basis weight in the range from about 75-700 gsm, with said superabsorbent polymeric material in a range of about 0-55%, by weight, and said wax in a range of about 2-15%, by weight.

4. An absorbent material in accordance with claim 3, wherein:
hydrogen bonding provides said sheet of absorbent material with a dry tensile strength of at least 10 Newton/50 mm.

5. An absorbent material in accordance with claim 3, including:
at least one tissue layer applied to at least one of the upper and lower surfaces of said sheet of absorbent material.

6. An absorbent material, comprising:
a blend of cellulosic fibrous material, superabsorbent polymeric material, and a wax having a melting point less than 100° C., in the form of a sheet of absorbent material having upper and lower surfaces, that has non-trivial wet shear and wet tensile strengths
wherein said material exhibits a centrifuge retention value greater than 80% of a centrifuge retention value of a sheet of material having a like blend of cellulosic fibrous material and superabsorbent polymeric material without any wax content,
wherein said sheet of absorbent material has a basis weight in the range from about 50-1500 gsm, with said superabsorbent polymeric material in a range of about 0-70%, by weight, and said wax in a range of about 0.1-20%, by weight.

7. An absorbent material in accordance with claim 6, wherein:
said centrifuge retention value of said sheet of absorbent material is greater than 30 grams/grams per weight percent, in decimal form, of superabsorbent polymeric material content in said sheet.

8. An absorbent material in accordance with claim 6, wherein:
hydrogen bonding provides said sheet of absorbent material with a dry tensile strength of at least 10 Newton/50 mm.

9. An absorbent material in accordance with claim 6, wherein:
said sheet of absorbent material is airlaid, and bonded by the application of heat and pressure to said blend of cellulosic fibrous material, superabsorbent polymeric material, and said wax.

10. An absorbent material in accordance with claim 6, wherein:
said absorbent material has a non-uniform distribution of said wax.

11. An absorbent material in accordance with claim 6, wherein:
said absorbent material has a non-uniform distribution of wax, with continuities of relatively higher concentrations or penetrations of said wax extending in at least one of thickness, length and width directions of said sheet of absorbent material.

12. An absorbent material in accordance with claim 6, wherein:
said sheet of absorbent material has a basis weight in the range from about 75-700 gsm, with said superabsorbent polymeric material in a range of about 0-55%, by weight, and said wax in a range of about 2-15%, by weight.

13. A method of making an absorbent material in accordance with claim 10, including:
applying heat to said blend during said compacting step.

14. A method of making an absorbent material, comprising the steps:
airlaying a substantially homogeneous blend of cellulosic fibrous material and superabsorbent polymeric material;
compacting said blend to form a sheet of absorbent material having upper and lower surfaces, said sheet of absorbent material including regions of relatively high densification formed at particles of superabsorbent polymeric material; and applying a discontinuous distribution of wax to said blend, to produce a sheet of absorbent material, including localized concentrations or penetrations of said wax in at least some of the regions of relatively high densification which exhibits a centrifuge retention value greater than 80% of a centrifuge retention value of a sheet of material having a like blend of cellulosic fibrous material and superabsorbent polymeric material without any wax content, wherein said sheet of absorbent material has a basis weight in the range from about 75-700 gsm, with said superabsorbent polymeric material in a range of about 0-55%, by weight, and said wax in a range of about 2-15%, by weight.

15. A method of making an absorbent material in accordance with claim 14, wherein:

said centrifuge retention value of said sheet of absorbent material is greater than 30 grams/grams per weight percent, in decimal form, of superabsorbent polymeric material.

16. A method of making an absorbent material in accordance with claim 14, wherein:

said absorbent material has a non-uniform distribution of wax, with continuities of relatively higher concentrations of said wax extending in at least one of thickness, length and width directions of said sheet of absorbent material.

17. A method of making an absorbent material in accordance with claim 16, wherein:

said continuities of relatively higher concentrations or penetrations of said wax extending in laterally spaced relationship to each other in a machine direction of said sheet of absorbent material.

18. A method of making an absorbent material in accordance with claim 14, wherein:

during said compacting step, said blend is compacted by cooperating calender rollers, said step of applying wax being effected by application of said wax to at least one of said calender rollers so that said wax is transferred and applied to said blend.

19. A method of making an absorbent material comprising the steps of:

airlaying a substantially homogeneous blend of cellulosic fibrous material and particulate superabsorbent polymeric material;

compacting said blend to form a sheet of absorbent material having upper and lower surfaces, including forming said sheet of absorbent material with regions of relatively high densification about particles of said superabsorbent polymeric material; and applying a discontinuous distribution of said wax in said sheet of absorbent material to form localized concentrations of said wax in at least some regions of relatively high densification of said sheet of absorbent material, wherein said sheet of absorbent material has a basis weight in the range from about 75-750 gsm, with said superabsorbent polymeric material in a range of about 0-55%, by weight, and said wax in a range of about 2-15%, by weight.

20. A method of making an absorbent material in accordance with claim 19, including:

compacting said blend with at least one calender roller operating at a temperature greater than 100 degrees C., and applying said wax to said sheet by application of said wax to said calender roller for transfer and application of said wax to said sheet of absorbent material.

21. A method of making an absorbent material in accordance with claim 20, wherein:

said calender roller has a pattern thereon to form regions of relatively high densification in said sheet of material, said wax being preferentially applied to said pattern on said calendar roller so that said wax is preferentially distributed to said regions of relatively high densification in said sheet of absorbent material.

* * * * *